Figure 1:
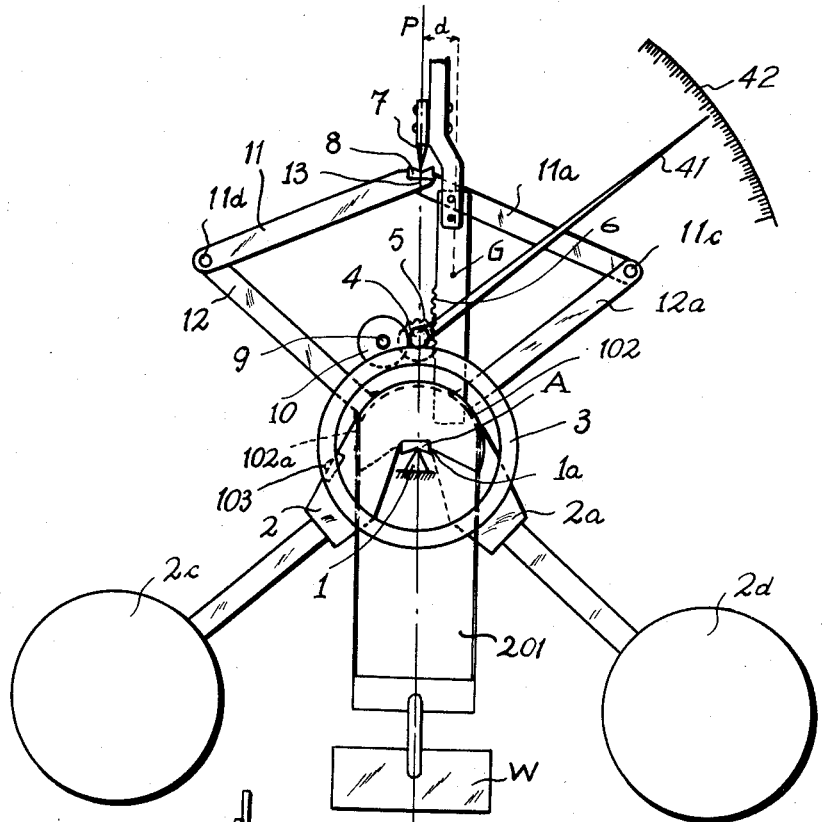

June 28, 1960

A. MALAFARINA 2,942,865

SUPPORTING DEVICE OF A POINTER SPINDLE FOR
WEIGHING MACHINES WITH CIRCULAR DIALS

Filed July 1, 1955

INVENTOR.

BY Aldo Malafarina

Michael S. Striker
Attorney

United States Patent Office 2,942,865
Patented June 28, 1960

2,942,865

SUPPORTING DEVICE OF A POINTER SPINDLE FOR WEIGHING MACHINES WITH CIRCULAR DIALS

Aldo Malafarina, % Ing. Giambrocono, Via Durini 4, Milan, Italy

Filed July 1, 1955, Ser. No. 519,524

Claims priority, application Italy July 6, 1954

8 Claims. (Cl. 265—62)

This invention relates to supporting means of a pointer spindle for weighing machines having a graduated scale and particularly to weighing machines having uniform graduations on its dial scale. Known weighing machines provided with a pointer spindle connected to a pinion and rack drive suffer from the disadvantage that even a small displacement of the supporting means results in a disproportionate displacement of the pointer from the zero position on the graduated scale. The support drivingly connected to a rack in mesh with a pinion connected to the pointer.

Since the oscillatory device including the pendulum levers has a considerable weight, the sharp edge of the knife edge on which the oscillatory device rests is soon worn off and the oscillatory device changes its position in relation to the knife edge. In this manner the position of the pointer in relation to the graduation scale is also altered. Even a small fraction of a millimeter in the change of the position of the oscillatory device on the knife edge will result in a disproportionate large displacement of the pointer on the dial scale.

It is one object of this invention to remove the disadvantages of the operation of such a device resulting from the lowering of the oscillatory device due to a wear of the knife edge.

It is a further object of this invention to provide an arrangement whereby support of the rack on the oscillatory device will be lowered by an amount corresponding to the wear of the knife edge so that the rack holds the pointer in the same zero position on the scale.

With these objects in view, the present invention provides in a pendulum scale the combination of pendulum means having a circular guide portion, a horizontal knife edge supporting the pendulum means for oscillatory turning movement about the circular guide portion, articulated means connected to the pendulum means and having a portion guided for movement in vertical direction, this portion moving in a vertical direction when the pendulum means turns about the knife edge, rack bar means supported on the portion of the articulate means for movement with the same in the vertical direction, a pointer spindle supported on the circular guide portion and having an axis located in a vertical plane passing through that knife edge. Also provided are a pinion fixed on the pointer spindle and meshing with the rack bar means, and means for maintaining the pointer spindle in a vertical plane during turning movement of the pendulum means and of the circular guide portion thereof whereby lowering of the pendulum means of the rack bar means due to wearing off of said knife edge is compensated by the lowering of the pointed spindle and of the pinion due to the lowering of the circular guide portion.

Figure 2:
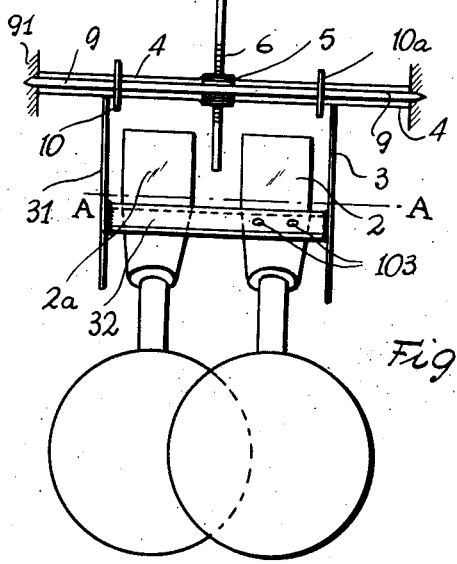

The invention, both as to its construction and its method of operation, together with additional objects and advantages thereof, will be best understood from the following description of a specific embodiment when read in connection with the accompanying drawings, in which:

Figure 1 is a fragmentary front view of the device according to the present invention, and Figure 2 is a fragmentary side view of the device shown in Figure 1.

Referring now to the drawing, on a knife edge 1 two pendulum levers 2 and 2a are mounted by means of bearing 1a. The pendulum levers 2 and 2a are free to oscillate about the axis A—A passing through the knife edge. The portions 102 and 102a of the levers are arcuate. Two flexible bands 201 are attached with the bent upper portions thereof, respectively, to the arcuate portions of levers 102 and 102a. The lower ends of bands 201 are connected by a member 201a and a weight is attached to member 201a in the vertical plane P—P so that the pendulum levers will turn in opposite direction until the weight is balanced. The degree of angular displacement of the pendulum levers 2, 2a is a measure of the weight.

Pendulum lever 2 is secured by screws 103 to a cross bar 32 which connects two ring-shaped members 3 and 31. Consequently the ring-shaped members 3 and 31 will turn with pendulum lever 2 during a weighing operation. The rings 3 and 31 have a circular periphery which is concentric with the axis A—A passing through the knife edge 1. Weights 2c and 2d are attached to pendulums 2 and 2a, respectively.

An articulated lever system 11, 12, 11a, 12a is provided. Levers 11 and 12 are pivotally connected at 11d to each other, and lever 12 is secured to the upper portion of pendulum lever 2. Levers 11a and 12a are pivotally connected at 11c, and lever 12a is fixedly secured to the upper portion of pendulum lever 2a. Levers 11 and 11a are pivotally connected by a pivot means 13 which carries a bearing member 8. Relative angular displacement of the pendulum levers 2, 2a will consequently result in raising and lowering of the bearing 8.

A knife edge 7 is fixedly secured to the rack bar 6 and rests on the bearing 8. The center of gravity of the rack bar 6 is spaced a distance $d$ from a vertical plane passing through the axis A—A in which the knife edge 7 is arranged.

The rack bar 6 meshes with a pinion 5 which is fixed on the pointer spindle 4 to which a pointer 41 is attached for indicating the angular displacement of the pointer spindle on the uniform dial scale 42.

In order to hold the pointer spindle 4 in the vertical plane P—P, a shaft 9 is provided with two rollers 10 and 10a which engage the pointer spindle 4. Shaft 9 is turnably mounted in the frame of the machine as schematically shown at 91.

The device operates in the following manner:

When a weight W is attached to a loop of the flexible band 201 whose ends are secured to the arcuate upper portions 102 and 102a of the pendulum levers 2 and 2a, the pendulum levers 2 and 2a will be angularly displaced relative to each other until the weights of the pendulum levers balance the weighted load. This weighing function is known and not an object of the present invention.

The articulated lever system 11, 12, 11a, 12a will be correspondingly displaced since the levers 12 and 12a are respectively secured to the levers 2 and 2a. Consequently, the pivot means 13 will move in a vertical plane P—P, and take along the rack bar 6. When the levers 2, 2a are in balanced position, the rack bar will have been displaced to a certain extent, and such displacement will result in turning of the pointer spindle 4 through the pinion 5. The pointer 41 will turn with spindle 4 and indicate the measured weight on the scale 42.

It will be noted that turning of lever 2 with the rings 3 and 31 will not displace the spindle 4 in vertical direction, since the periphery of the rings 3 and 31 is concentric with the axis A—A about which the levers 2 and 2a swing. The rollers 10 and 10a hold the spindle 4 in the vertical plane P—P. When the knife edge 1 is worn off, the pendulum levers 2 and 2a are lowered. Since the rack bar 6 is connected to the pendulum levers 2, 2a by the articulated lever system, the rack bar 6 is also lowered. If the pointer shaft were mounted in the frame of the machine and stationary, the pinion 5 would be turned resulting in an incorrect zero indication of the pointer. However, in accordance with the present invention the pointer spindle 4 is supported by the knife edge 1 through the pendulum lever 2 and the rings 3 and 31 so that the pointer spindle 4 is lowered to the same extent as the rack bar 6, and no indication takes place when the knife edge 1 is worn off.

Due to the provision of the circular peripheral guide surfaces on the rings 3 and 31, swinging of pendulum 2 is possible without vertical displacement of the pointer spindle 4.

It is evident that instead of rings 3 and 31, sector-shaped members could be used, since only a small portion of the circular periphery of rings 3 and 31 is used for supporting the pointer spindle 4 in all displaced positions of the pendulum levers 2 and 2a.

In order to limit to the highest degree the slip between said rings 3, 3' of diameter $d$ and the pointer spindle 4 of diameter D, if $X°$ is the maximal angular displacement of the pinion, $x°$ is the angular displacement of pendular levers, said diameter D of the pinion is proportionated in accordance to the formula $$D = \frac{d \cdot x°}{X°}$$

What I claim is:

1. In a pendulum scale, in combination, pendulum means having a circular guide portion; a horizontal knife edge supporting said pendulum means for oscillatory turning movement about said circular guide portion; articulated means connected to said pendulum means and having a portion guided for movement in vertical direction, said portion moving in vertical direction when said pendulum means turns about said knife edge; rack bar means supported on said portion of said articulated means for movement with the same in vertical direction; a pointer spindle supported on said circular guide portion and having an axis located in a vertical plane passing through said knife edge; a pinion fixed on said pointer spindle and meshing with said rack bar means; and means for maintaining said pointer spindle in said vertical plane during turning movement of said pendulum means and of said circular guide portion whereby lowering of said pendulum means and of said rack bar means due to wearing off of said knife edge is compensated by the lowering of said pointer spindle and of said pinion due to the lowering of said circular guide portion.

2. In a pendulum scale, in combination, pendulum means having a circular guide portion; a horizontal knife edge located at the center of said circular guide portion and supporting said pendulum means for oscillatory turning movement about an axis passing through the center of said circular guide portion; articulated means connected to said pendulum means and having a portion guided for movement in a vertical plane passing through said knife edge, said portion moving in said vertical plane when said pendulum means turns about said axis; rack bar means supported on said portion of said articulated means for movement with the same in vertical direction, said rack bar means having a rack portion extending parallel to said vertical plane; a pointer spindle supported on said circular guide portion and having an axis parallel to said knife edge and located in said vertical plane passing through said knife edge; a pinion fixed on said pointer spindle and meshing with said rack portion; and means for maintaining said pointer spindle in said vertical plane during turning movement of said pendulum means and of said circular guide portion whereby lowering of said pendulum means and of said rack bar means due to wearing off of said knife edge is compensated by the lowering of said pointer spindle and of said pinion due to the lowering of said circular guide portion.

3. A device as set forth in claim 2 wherein said portion of said articulated means is a bearing; and wherein said rack bar means includes a knife edge located in said vertical plane and supported on said bearing.

4. In a pendulum scale, in combination, pendulum means having a circular guide portion; a horizontal knife edge supporting said pendulum means for oscillatory turning movement about the center of said circular guide portion; articulated means connected to said pendulum means and having a portion guided for movement in a vertical plane passing through said knife edge, said portion moving in said vertical plane when said pendulum means turns about said axis; rack bar means supported on said portion of said articulated means for movement with the same in vertical direction, said rack bar means having a rack portion extending parallel to said vertical plane; a pointer spindle supported on said circular guide portion and having an axis parallel to said knife edge and located in said vertical plane passing through said knife edge; a pinion fixed on said pointer spindle and meshing with said rack portion; and a shaft having an axis parallel to said knife edge and being guided for vertical movement; and roller means connected to said shaft and engaging said pointer spindle on the side thereof remote from said rack portion for maintaining said pointer spindle in said vertical plane and in engagement with said rack portion during turning movement of said pendulum means and of said circular guide portion whereby lowering of said pendulum means and of said rack bar means due to wearing off of said knife edge is compensated by the lowering of said pointer spindle and of said pinion due to the lowering of said circular guide portion.

5. An arrangement as set forth in claim 4 wherein said roller means include two rollers fixedly connected to said shaft and having peripheral rims in rolling contact with said pointer spindle, said rollers being equally spaced from said pinion.

6. In a pendulum scale, in combination, a pendulum means including pendulum lever means and a pair of control members fixedly connected to said pendulum lever means and to each other, said control members having parallel circular guide portions and being spaced in axial direction from each other; a horizontal knife edge supporting said pendulum means for oscillatory turning movement about an axis passing through the centers of said parallel circular guide portions; articulated lever means connected to said pendulum lever means and having a portion guided for movement in vertical direction, said portion moving in vertical direction when said pendulum means turns about said knife edge; rack bar means supported on said portion for movement with the same in vertical direction; a pointer spindle having end portions respectively supported on said circular guide portions and having an axis located in a vertical plane passing through said axis and said knife edge; a pinion fixed on said pointer spindle and meshing with said rack bar means; and means for maintaining said pointer spindle in said vertical plane during turning movement of said pendulum means and of said control members whereby lowering of said pendulum means and of said rack bar means due to wearing off of said knife edge is compensated by the lowering of said pointer spindle and of said pinion due to the lowering of said control members.

7. An arrangement as set forth in claim 6 wherein said rack bar means includes a knife edge pivotally supported on said portion and located in said vertical plane, and a rack portion extending parallel to said vertical plane in a vertical direction and meshing with said pinion.

8. An arrangement as set forth in claim 7 wherein said means for maintaining said pointer spindle in said vertical plane include a shaft extending parallel to said knife edge in horizontal direction, and a pair of rollers fixed on said shaft and being in rolling contact with said pointer spindle and spaced equal distances from said pinion.

References Cited in the file of this patent

UNITED STATES PATENTS

| | | |
|---|---|---|
| 1,564,847 | Hem | Dec. 8, 1925 |
| 1,788,020 | Gilbert | Jan. 6, 1931 |
| 2,045,974 | Von Pein et al. | June 30, 1936 |
| 2,705,628 | Bengtsson | Apr. 5, 1955 |